United States Patent [19]

Coppersmith et al.

[11] Patent Number: 5,675,652
[45] Date of Patent: Oct. 7, 1997

[54] COMPUTER READABLE DEVICE IMPLEMENTING A SOFTWARE-EFFICIENT PSEUDORANDOM FUNCTION ENCRYPTION

[75] Inventors: Don Coppersmith, Ossining, N.Y.; Phillip W. Rogaway, Austin, Tex.

[73] Assignee: International Business Machines Corporation, Austin, Tex.

[21] Appl. No.: 478,176

[22] Filed: Jun. 7, 1995

Related U.S. Application Data

[63] Continuation of Ser. No. 163,054, Dec. 6, 1993, Pat. No. 5,454,039.
[51] Int. Cl.$^6$ .................................................. H04L 9/00
[52] U.S. Cl. ..................... 380/28; 380/9; 380/29; 380/30; 380/33; 380/46; 380/49; 380/50
[58] Field of Search ........................ 364/717; 331/78; 380/9, 21, 28, 29, 30, 33, 43, 46, 49, 50

[56] References Cited

U.S. PATENT DOCUMENTS

| | | | |
|---|---|---|---|
| 4,907,274 | 3/1990 | Nomura et al. | 380/30 |
| 4,944,009 | 7/1990 | Micali et al. | 380/46 |
| 5,003,598 | 3/1991 | Merkle | 380/37 |

OTHER PUBLICATIONS

Merkle, "Fast Software Encryption Functions," Proceedings of Crypto '91, Springer-Verlag, pp. 476–501.
A. Shimizu and S. Miyaguchi, "Fast Data Encipherment Algorithm FEAL," Eurocrypt '87, pp. 267–278.
O. Goldreich, S. Goldwasser and S. Micali, "How to Construct Random Functions," Journal of the ACM, vol. 33, No. 4, pp. 210–217 (1986).

Macintosh SE Owner's Guide, Apple Computer, Inc., (pp. 72–74, 1988).

*Primary Examiner*—Bernarr E. Gregory
*Attorney, Agent, or Firm*—Jeffrey S. LaBaw; David H. Judson

[57] ABSTRACT

A software-efficient pseudorandom function maps an index and an encryption key to a pseudorandom bit string useful for constructing a stream cipher. The method begins by preprocessing the encryption key into a table of pseudorandom values. The index and a set of values from the table is then used to generate a set of initial values for the registers. At least some of the register values are modified in part by taking a current value of a register and replacing the current value with a function of the current value and a value retrieved from the table, the latter value being determined by the values in one or more other registers. After modifying the register values in this fashion, the values are masked using other values from the table and the results then concatenated into the pseudorandom bit string. The modification step is repeated and a new masked function of the register values is then concatenated into the pseudorandom bit string. The modification and concatenation steps are repeated to continue growing the pseudorandom bit string until the string reaches some desired length.

9 Claims, 5 Drawing Sheets

PROCEDURE INITIALIZE$_{T,R}$ (n,$\ell$,A,B,C,D,$n_1$,$n_2$,$n_3$,$n_4$.)

1    A ← n⊕R [4$\ell$];
2    B ← (n>>>8)⊕R [4$\ell$+1];
3    C ← (n>>>16)⊕R [4$\ell$+2];
4    D ← (n>>>24)⊕R [4$\ell$+3];

FOR j ← 1 to 2 do

5    P ← A&0x7fc;   B ← B+T [P/4];   A ← A>>>9;
6    P ← B&0x7fc;   C ← C+T [P/4];   B ← B>>>9;
7    P ← C&0x7fc;   D ← D+T [P/4];   C ← C>>>9;
8    P ← D&0x7fc;   A ← A+T [P/4];   D ← D>>>9;

9    ($n_1$,$n_2$,$n_3$,$n_4$) ← (D,B,A,C);

10   P ← A&0x7fc;   B ← B+T [P/4];   A ← A>>>9;
11   P ← B&0x7fc;   C ← C+T [P/4];   B ← B>>>9;
12   P ← C&0x7fc;   D ← D+T [P/4];   C ← C>>>9;
13   P ← D&0x7fc;   A ← A+T [P/4];   D ← D>>>9;

FUNCTION SEAL$_a$ (n)

y=λ;

FOR $l \leftarrow$ 0 to ∞ do

INITIALIZE$_{T,R}$ (n,$l$,A,B,C,D,n$_1$,n$_2$,n$_3$,n$_4$,);

FOR i $\leftarrow$ 1 to 64 do

1    P $\leftarrow$ A&0x7fc;     B $\leftarrow$ B+T [P/4];    A $\leftarrow$ A>>>9;    B $\leftarrow$ B⊕A;

2    Q $\leftarrow$ B&0x7fc;     C $\leftarrow$ C⊕T [Q/4];    B $\leftarrow$ B>>>9;    C $\leftarrow$ C+B;

3    P $\leftarrow$ (P+C)&0x7fc;    D $\leftarrow$ D+T [P/4];    C $\leftarrow$ C>>>9;    D $\leftarrow$ D⊕C;

4    Q $\leftarrow$ (Q+D)&0x7fc;    A $\leftarrow$ A⊕T [Q/4];    D $\leftarrow$ D>>>9;    A $\leftarrow$ A+D;

5    P $\leftarrow$ (P+A)&0x7fc;    B $\leftarrow$ B⊕T [P/4];    A $\leftarrow$ A>>>9;

6    Q $\leftarrow$ (Q+B)&0x7fc;    C $\leftarrow$ C+T [Q/4];    B $\leftarrow$ B>>>9;

7    P $\leftarrow$ (P+C)&0x7fc;    D $\leftarrow$ D⊕T [P/4];    C $\leftarrow$ C>>>9;

8    Q $\leftarrow$ (Q+D)&0x7fc;    A $\leftarrow$ A+T [Q/4];    D $\leftarrow$ D>>>9;

9    y $\leftarrow$ y || B+S[4i-4] || C⊕S[4i-3] || D+S[4i-2] || A⊕S[4i-1];

10   IF |y|≥L THEN RETURN ($y_0 y_1 ... y_{L-1}$);

11   IF odd(i) THEN (A,C) $\leftarrow$ (A+n$_1$,C+n$_2$)

ELSE (A,C) $\leftarrow$ (A+n$_3$,C+n$_4$);

*FIG. 3*

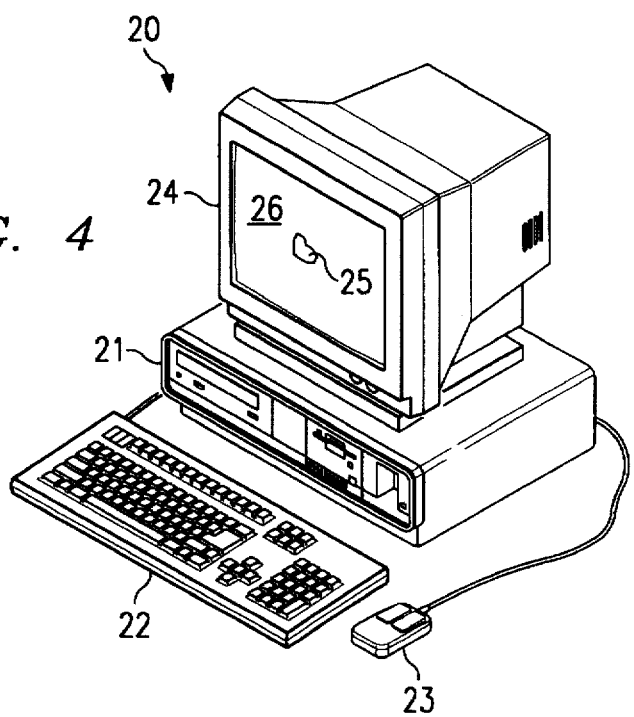

*FIG. 4* ns. 5,675,652

COMPUTER READABLE DEVICE IMPLEMENTING A SOFTWARE-EFFICIENT PSEUDORANDOM FUNCTION ENCRYPTION

This is a continuation of application Ser. No. 08/163,054 filed on Dec. 6, 1993, now U.S. Pat. No. 5,454,039.

TECHNICAL FIELD

The present invention relates generally to methods for data encryption and more particularly to software-optimized encryption techniques that exhibit high speed and computational efficiency on conventional processor platforms.

BACKGROUND OF THE INVENTION

Cryptographic systems are widely used to insure the privacy and authenticity of messages communicated over insecure channels. In many applications, it is necessary that encryption be performed at high data rates, a requirement usually achieved, if at all, with the help of supporting cryptographic hardware. Such hardware, however, is not available on most conventional computer systems. Moreover, even when cryptographic hardware is available, it has been found that an algorithm designed to run well in hardware does not perform in software as well as an algorithm optimized for software execution. The hardware-efficient algorithm of the Data Encryption Standard (DES) is no exception.

Prior attempts to design encryption methods for efficient implementation in software are known in the prior art. Several of these functions are described in U.S. Pat. No. 5,003,597 and in the article entitled "Fast Software Encryption Functions", R. Merkle, *Advances in Cryptology, CRYPTO '90 Proceedings*, Springer-Verlag. In general, the Merkle technique constructs a fixed length or "block" cipher by operating upon a data input having two halves: a left half and a right half. The left half is used as an index to access a table of pseudorandom numbers to thereby retrieve a table value. That value is then exclusively ORed (XOR) with the right half of the data input and the result relabeled as the left half. The original left half is then rotated by a predetermined amount and relabeled as the right half. The iterative process is then continued in this fashion until the data input is fully randomized. To achieve high speed, in one embodiment the table of pseudorandom numbers is precomputed.

The Merkle technique and other known software-oriented block ciphers provide advantages over prior art hardware-based encryption techniques. Nevertheless, there remains a need to provide improved software-efficient encryption techniques that exhibit high speed and computational efficiency on conventional processor platforms.

BRIEF SUMMARY OF THE INVENTION

It is an object of the present invention to provide a software-efficient pseudorandom function for mapping an index and a key to a pseudorandom sequence of bits. The index is short (e.g., 32-bits) while the output bit sequence is potentially very long. The pseudorandom bit string is useful for constructing a stream cipher.

The pseudorandom function is a cryptographic "object" that preferably maps the index "n" and an encryption key to an pseudorandom bit sequence. The method begins by preprocessing the encryption key into a table of pseudorandom values. The index and a set of values from the table is then used to generate initial values for a plurality of registers. Using a predetermined mixing function, the initial values of some of the registers are then modified in part by taking a current value of a register and replacing the current value with a function of the current value and a value retrieved from the table, the latter value being determined by portions of one or more other registers. After modifying the registers in this fashion, their resulting values are masked using other pseudorandom values derived from the table and a predetermined masking function. The masked register values are then concatenated into the pseudorandom bit string to complete an iteration. Subsequent iterations are performed to grow the pseudorandom bit string to a desired length.

The stream generated in this fashion is a pseudorandom sequence of bits that is useful by way of example for encrypting a plaintext "string" relative to a particular "position". The length of the pseudorandom bit string is as many bits as the plaintext string is long. Thus, the inventive encryption method is uniquely adapted for use in various types of software cryptography. For example, where the application involves encrypting messages over an insecure communications channel, the "string" is a particular message and the "position" is a sequence number identifying the message's position in a data stream. In this application, the encryption key is a key which protects the communication session. In yet another application, disk encryption, the "string" represents a particular sector of data to be written to or read from a disk, and the "position" is an index identifying the position of the sector on the mass storage device. In the disk encryption application, the key used to generate the table is preferably derived from a password entered by a user. Typically, in each application the particular "string" involved is encrypted by XOR-ing the string and the pseudorandom bit stream which is output by the pseudorandom function of the invention.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 describes the preferred embodiment of the pseudorandom function for generating the pseudorandom bit string $SEAL_a(n)$;

FIG. 4 illustrates a computer comprising a system unit, a keyboard, a mouse and a display, for use in implementing the pseudorandom function and for using this function for encryption;

DETAILED DESCRIPTION

The inventive pseudorandom function is optimized to perform efficiently in software and is preferably implemented on a 32-bit processor of conventional design. Such processors, e.g., include the Intel 386™, Intel 486™ and the Pentium™ Processor, as well as 32-bit Reduced Instruction Set Computer (RISC) processors. While these execution vehicles are preferred, the invention in the preferred embodiment detailed below is appropriate to any byte-addressable general purpose 32-bit processor.

For convenience, the following notation is used herein. A 32-bit string is a "word" and an 8-bit string is a "byte". The empty string is denoted $\lambda$. The bits of a length-t string are numbered $x_0 x_1 \ldots x_{t-1}$. Numbers in hexadecimal are written by preceding them with "0x" and then using the symbols "a"–"f" to represent decimal 10–15, respectively. By y>>>t, a right circular shift of the word y by t bits is denoted; in other words, the bit i of y>>>t is $y_{(i-t) mod 32}$. The symbols "$\wedge$" "$\vee$" and "$\oplus$" denote bitwise AND, OR and XOR functions. The expression A+B denotes the sum, ignoring carry, of unsigned words A and B; this is the sum mod32 of words A and B. The symbol "||" denotes the concatenation operator. The symbol odd(•) means the predicate which is true if and only if its argument is an odd number. The designation A[i] means the i-th entry of the array A. Further, if x is a real number, then [x] denotes the smallest integer greater than or equal to x, and [x] denotes the largest integer less than or equal to x.

Several variables used in the following description are referred to as "registers." A "register" as used herein may or may not correspond to a physical register associated with the processor. It is a construct that can be said to have a particular "value." Some registers ($n_1$, $n_2$, $n_3$, $n_4$) are initialized and retain their values for many steps of the algorithm. Other registers (A, B, C, D) have values which can change more frequently. Every register has a "current value" at a particular instant of time. As will be seen, according to one aspect of the inventive method, a "current value" of a register is typically modified by replacing the current value with a function of the current value and a value derived from a table of pseudorandom number values.

Figures 1, 2:
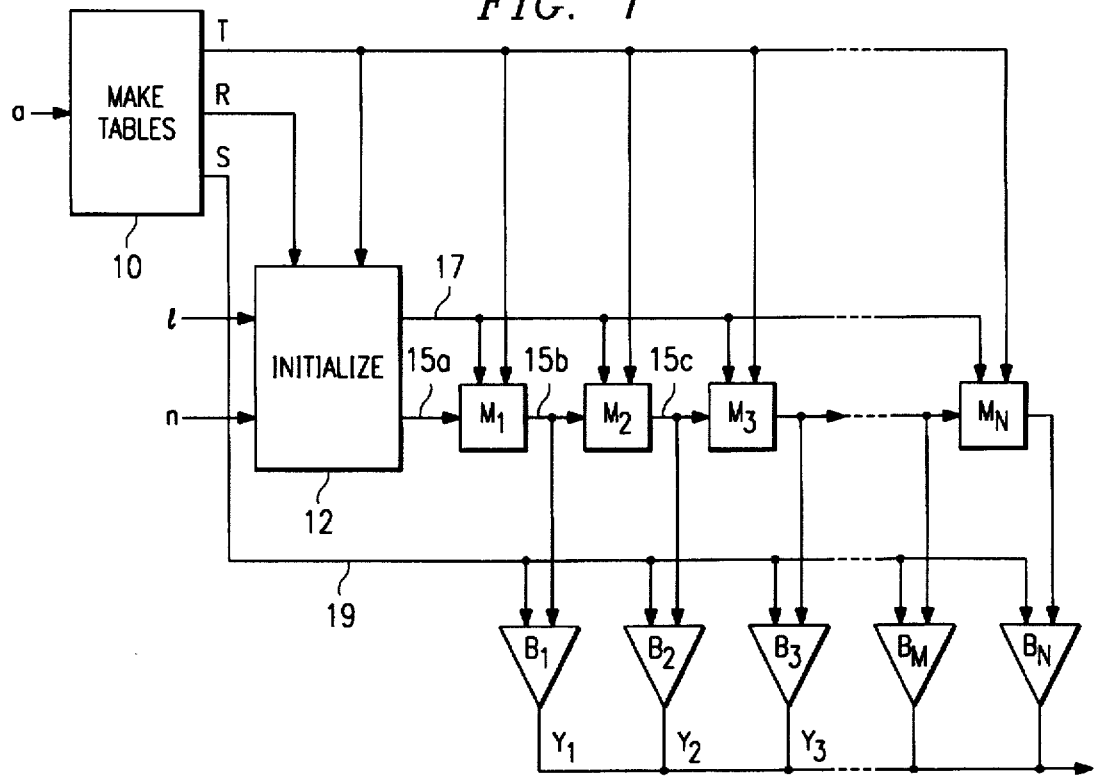
FIG. 1 is a process flow representation of a portion of the inventive pseudorandom function for mapping a 32-bit index "n" to a pseudorandom L-bit string $SEAL_a(n)$ under the control of a set of tables T, R and S generated from a key "a"
FIG. 2 describes the Initialize process of FIG. 1.

With particular reference now to FIG. 1, a process flow diagram is shown detailing a method for mapping a 32-bit index "n" to an L-bit string $y=SEAL_a(n)$ under the control of a set of tables T, R and S generated from a key "a." The method begins by preprocessing the key "a" into preferably three (3) tables T, R and S. This step is effected using a Make Table procedure 10 which receives as an input the key "a." In this particular example, the key is a 160-bit string that, in conjunction with a function G described below, is used to define the three tables. While the use of three tables is preferred, it should be appreciated that the three tables can be thought of as merely one table or array with three different parts. The description of three (3) distinct tables is thus merely exemplary and should not be taken by way of limitation as other table groupings or structures are useful as well to implement the present invention.

The pseudorandom values in the tables are specified using any one or more algorithms known in the art. The particular algorithm used is not critical to the present invention and it is envisioned that any secure pseudorandom generator is useful for this purpose. The pseudorandom generator thus may be derived from a secure hash algorithm, a block cipher, a stream cipher, and so on. For example, the algorithm used to generate the tables could be based on DES, MD5, the Secure Hash Algorithm (SHA) or even a combination of any of the above. According to the illustrative embodiment, the function G is described in National Institute of Standards, "Digital Signature Standard," Federal Information Processing Standards Publication XX Draft—February 1993, which is incorporated herein by reference. The function G is based on the Secure Hash Algorithm (SHA) described in National Institute of Standards, "Secure Hash Standard," Federal Information Processing Standards Publication 180, which is also incorporated herein by reference. Details of SHA and the particular function G can be obtained from these references (with the notation $G_a(i)$ used in place of the notation G(a,i) in the references).

With the key "a" being a 160-bit string and i being an integer, $0 \leq i < 2^{32}$, $G_a(i)$ is a 160-bit value. To construct the tables, G is re-indexed by the Make Table procedure 10 to construct a function whose images are 32-bit words instead of 160-bit ones. The function $\Gamma$ is defined by $\Gamma_a(i) = H^i_{i mod 5}$ where $H^i_0 H^i_1 H^i_2 H^i_3 H^i_4 = G_a(\lfloor i/5 \rfloor)$. Thus a table of $\Gamma$-values is a table for G-values read left-to-right, top-to-bottom. The Make Tables procedure 10 then preferably defines the tables as follows:

$T[i] = \Gamma_a(i)$ for all $0 \leq i < 512$;

$S[j] = \Gamma_a(0 \times 1000 + j)$ for all $0 \leq j < 256$; and $R[k] = \Gamma_a(0 \times 2000 + k)$ for all $0 \leq k < 4\lceil (L-1)/8192 \rceil$.

Thus table T has 512 word entries, with each entry being 32-bits in length. The entries of tables S and R are also 32-bit words. Table S has 256 entries and table R has a variable length.

Referring back to FIG. 1, the tables T and R are used by an Initialize procedure 12, which also receives as inputs the index "n" and a length control variable "l". The variable "l" is initially set to "0" and its upper limit will depend on the ultimate desired length of the output stream. The Initialize procedure 12 generates a set of initial values for the registers (A, B, C, D, $n_1$, $n_2$, $n_3$, $n_4$). The first group of registers (A, B, C, D) have values that will be modified during a particular "iteration" of the algorithm to be described, whereas the second group of registers ($n_1$, $n_2$, $n_3$, $n_4$) have values that remain constant throughout the "iteration". The method further implements a set of mixing functions, $M_1 \ldots M_N$, and a set of masking functions $B_1 \ldots B_N$, with N preferably equal to 64. Each mixing function $M_i$ has a corresponding masking function $B_i$, and an "iteration" generally comprises a pair of such functions. Thus, mixing function $M_1$ and masking function $B_1$ are effected during a first iteration of the method, and so on. The sixty-four (64) iterations together define a "phase" of the algorithm, with each phase initiated by a call to the Initialize process 12. When the particular phase is complete, the value of "l" in incremented.

The initial values of registers (A, B, C, D) of the first group are supplied via line 15a to the first mixing function $M_1$ during the first iteration. Mixing function $M_1$ also receives via line 17 the initial values of the second group of registers ($n_1$, $n_2$, $n_3$, $n_4$). As will be seen, the function $M_1$ comprises a set of modification instructions which serve to randomize the values of the registers (A, B, C, D) to generate a set of "pre-output" values for these registers on line 15b. The corresponding masking function $B_1$ receives these pre-output values as well as a set of values from table S via line 19. The masking function $B_1$ uses the set of values from table S to "mask" the pre-output register values from the corresponding mixing function to generate a data string of pseudorandom bits $y_1$.

In addition to being supplied to the masking function $B_1$, preferably the pre-output values of registers (A, B, C, D) on line 15b are also provided as inputs to the mixing function of the next iteration, in this case $M_2$. The mixing function also receives via line 17 the initial values of the second group of registers ($n_1$, $n_2$, $n_3$, $n_4$). As described above, these values are initialized by the Initialize process 12 and remain constant throughout the phase. The initial values of the second group of registers are used to modify the pre-output (or perhaps even the initial) values of the first group of registers (from the prior iteration) to allow the mixing function (in this case $M_2$) to more directly depend on information tied to the index n. The output of the mixing function $M_2$ on line 15c is supplied to masking function $B_2$, which receives these pre-output values as well as a next set of values from table S via line 19. The masking function $B_2$ uses the set of values from table S to "mask" the pre-output register values from the corresponding mixing function to generate a data string of pseudorandom bits $y_2$.

The iterations continue in this fashion. The particular data strings output from each iteration are concatenated to grow the output data stream. According to the invention, the table S is formatted to be of a sufficient size so that one pass through the S-table values corresponds to the sixty-four (64) iterations. As noted above, this cycle is a "phase." In the event that a phase does not produce a long enough output stream, a new phase is begin by a new call to the Initialize process 12 with "1" having been incremented by 1. That process then uses new R-values and begins the cycle again to create new initial values for the registers (A, B, C, D, $n_1$, $n_2$, $n_3$, $n_4$). The iterations of the phase are then begun again. The overall process is stopped when the length of the output stream reaches a desired value.

The Initialize process 12 is described in one particular embodiment in FIG. 2. This routine maps "n" and "1" in a (T,R)-dependent way to the first group of registers (A, B, C, D) and the second group of registers ($n_1$, $n_2$, $n_3$, $n_4$). The first execution or call to the Initialize process is run using the values of n and R[0], R[1], R[2] and R[3] in order to form the register values for the first phase. As noted above, if necessary the procedure may be run again (i.e., using R[4] ... R[7], R[8] ... R[11], etc.) to generate additional sets of register values to continue growth of the output data stream.

As seen in the first four lines of FIG. 2, during the first phase the procedure uses the index n and the first set of values R[0] ... R[3] from the table R to generate values for registers A, B, C and D. In the next four lines, the routine performs a number of functions to further randomize the registers A, B, C, D. Thus, e.g., line 5 includes the following steps:

$P \leftarrow A$ & 0x7fc; $B \leftarrow B+T[P/4]$; $A \leftarrow A{>>>}9$.

This notation is explained as follows. In the first instruction, the routine designates an intermediate variable P as the portion of the value located at 0x7fc in register A. That portion of A is then used as an index to Table T (as indicated by the expression "T[P/4]"). The notation P/4 is formally a division by 4, but in implementation means only that the instruction indexes into the array T in units of P bytes as opposed to units of P/4 words. The pseudorandom value located at position T[P/4] in table T is then retrieved and summed, ignoring carry, with the word in register B. This sum replaces the register B. This is the effect of the second instruction. Generalizing, the expression "$B \leftarrow B+T[P/4]$" thus takes a current value of a register B and replaces the current value with a function of the current value and a value retrieved from the table T; the latter value is determined by another register value, namely, the value indicated by bits 21 ... 29 (0x7fc) of register A. After the modification of register value B caused by the second step, the value in register A is rotated a predetermined amount and placed back into the register A. This is the effect of the instruction "$A \leftarrow A{>>>}9$." This completes line 5 of the routine.

Lines 6–8 of the routine provide similar functionality. After line 8, the values remaining in registers D, B, A and C are then defined as values $n_1$, $n_2$, $n_3$ and $n_4$, respectively, as indicated by the instruction ($n_1$, $n_2$, $n_3$, $n_4$) $\leftarrow$ (D, B, A, C) in line 9. Additional processing is then carried out on the register values A, B, C and D as indicated by the last four lines of the routine to thereby complete the randomizing process. After the procedure is run for the first set of values R[0] ... R[4], the routine thus has generated an initial set of values for each of the four registers A, B, C and D, and for each of the four registers $n_1$, $n_2$, $n_3$ and $n_4$.

Referring now to FIG. 3, it is seen how the values for registers (A, B, C, D) are used to map the 32-bit index n to an L-bit string $SEAL_a(n)$. For a particular "i" value, lines 1–8 and 11 correspond to the mixing function $M_i$, which as will been below performs a further randomizing function on the values in the registers (A, B, C, D) using additional values retrieved from table T and other rotation and operational instructions.

The preferred embodiment of the mixing function is now described. Thus, for example, line 1 of the function performs four separate instructions: the first instruction "$P \leftarrow A$ & 0x7fc" takes the piece of register A located at the designated position; the second instruction "$B \leftarrow B+T[P/4]$" uses the piece of register A now in P as an index to table T, with the value retrieved from table T then summed, ignoring carry, with a current value in register B and the result placed back in B; the third instruction "$A \leftarrow A{>>>}9$" rotates the value in register A; and the fourth instruction "$B \leftarrow B \oplus A$" generates an exclusive OR of register B (following its modification in the second instruction) and register A (following its rotation by the third instruction). The result of the fourth instruction is placed back in register B. The newly-defined value in register B is then used as the index for the next line (line 2) of the routine by virtue of the instruction "$Q \leftarrow B$ & 0x7fc" in line 2, and the process continues as shown.

Generalizing, it can be seen that the second instruction in each line takes a current value of a particular register and replaces the current value with a function (e.g., +, $\oplus$, etc.) of the current value and a value retrieved from table T. Moreover, the value retrieved from table T and useful in this function is determined by one or more values derived from other registers, i.e., the first instruction in each line. Thus, for example, a portion of the register A value is used as an index (to modify register B) in line 1 by virtue of instruction "$P \leftarrow A$ & 0x7fc" whereas, in line 3, register C and register A (by virtue of P) create the table index value. The latter index is generated by the instruction "$P \leftarrow (P+C)$ & 0x7fc."

The particular sequence of instructions shown in lines 1–8 has been found to be computationally efficient and produces well-randomized register values at very high speed on conventional processor platforms, especially when compared to encryption algorithms designed to be implemented in hardware.

After the process in lines 1–8 is carried out, the routine continues at line 9 to perform the masking process. In particular, line 9 corresponds to one of the masking processes $B_i$ of FIG. 1. In this process, a set of values (e.g., S[0] ... S[3], which are sequential words) is obtained from table S and used to "mask" the pre-output values of the registers (A, B, C, D) which exist following the running of the respective mixing process. This "masking" is preferably carried out for each register value (of the first set of registers (A, B, C, D)) to generate a masked register value. As seen in the illustrative instruction, the masking of the pre-output value in register B is effected by the portion of the instruction "B+S[4i−4]". Using sequential words retrieved from the table S, similar masking operations are performed on the other registers C, D and A as indicated by the instruction.

The masked register values are concatenated to form a data string $y_i$ for the particular iteration of the function $SEAL_a(n)$ defined by mixing function $M_i$ and its corresponding masking function $B_i$. After generating the data string $y_i$ for the particular iteration, the algorithm runs the instructions in step 11 to use the register values ($n_1$, $n_2$, $n_3$, $n_4$) to modify the non-masked register values (A, B, C, D) prior to the next iteration.

As noted earlier, when the 4-tuples from table S are exhausted, the function returns to FIG. 2 and re-runs the Initialize process for the next set of values from the R table. Once the new register values are determined, the "for i" loop of FIG. 3 is re-activated.

The outer loop of FIG. 2 is broken by the instruction in line 10 when enough output bits have been collected for the particular application using the pseudorandom function of the invention. As noted above, the variable L is the length of the output stream desired, and L is assumed to have a large bound, e.g., $L \leq 64 \times 1024 \times 8$ bits. The function stops generating bits as soon as it produces L' bits, where L' is the least multiple of 128 that is at least L. For a message encryption application, it will often be the case that L is less than 4096×8 bits, while for disk encryption on a personal computer, L will typically be 512×8 bits.

As seen in FIG. 3, generally it has been found desirable to alternate+and $\oplus$ operations when a particular register is modified. Thus, in line 1 the B register value is modified using an+operand whereas in line 5 the B value is modified using an $\oplus$ operand. It is likewise desirable to alternate these operands across the various registers during the processing of line 9. While such operations are preferred, the particular algorithm shown in FIG. 3 should not be taken as limiting the scope of the invention. For example, it may be desirable for some applications to use the same operator (+ or $\oplus$) throughout. It may be desirable to even omit the fourth instruction in each of lines 1–4 (the purpose of which is to more rapidly "diffuse" the information in the higher-order bits of A, B, C and D); alternatively, the degree of rotation in the third instruction in each line may be varied, or different lines may have different rotation instructions. The particular functions (+, $\oplus$) may be re-ordered or varied in numerous ways without affecting the basic purpose of the algorithm. All of these variations should be considered well within the scope of the present invention wherein a length-increasing pseudorandom function maps an index to an L-bit string under table-driven control.

The software-efficient pseudorandom function and its use thereof for encryption may be carried out on a number of different computers under a number of different operating systems. For example, a personal computer, a mini computer, mainframe computer or a computer running in a distributed network of other computers are useful for these purposes. Although specific choice of computer is limited only by disk and disk storage requirements, computers in the IBM PS/2™ series of computers could be used in the present invention. For additional information on IBM's PS/2 series of computers, the reader is referred to *Technical Reference Manual Personal Systems/2* Model 50, 60 systems IBM Corporation, Part No. 68x2224 Order Number S68X-2224 and *Technical Reference Manual Personal System/2 (Model 80) IBM Corporation* Part No. 68X 2256 Order Number S68X-2254. One operating system which an IBM PS/2 personal computer may run is IBM's OS/2 2.0™. For more information on the IBM OS/2 2.0 Operating System, the reader is referred to *OS/2 2.0 Technical Library. Programming Guide Vol.* 1, 2, 3 Version 2.00 Order Nos. 10G6261, 10G6495, 10G6494.

In the alternative, the computer system might be in the IBM RISC System/6000™ line of computers which run on the AIX™ operating system. The various models of the RISC System/6000 are described in many publications of the IBM Corporation, for example, *RISC System/6000. 7073 and 7016 POWERstation and POWERserver Hardware Technical reference.* Order No. SA23-2644-00. The AIX operating system is described in *General Concepts and Procedure—AIX Version 3 for RISC System/6000* Order No. SC23-2202-00 as well as other publications of the IBM Corporation.

One such computer is shown in FIG. 4. A computer 20, comprising a system unit 21, a keyboard 22, a mouse 23 and a display 24 are depicted. The screen 26 of display device 24 is used to present the graphical user interface (GUI). The graphical user interface supported by the operating system allows the user to use a point and shoot method of input, i.e., by moving the mouse pointer 25 to an icon representing a data object at a particular location on the screen 26 and pressing on the mouse buttons to perform a user command or selection.

Figure 5:
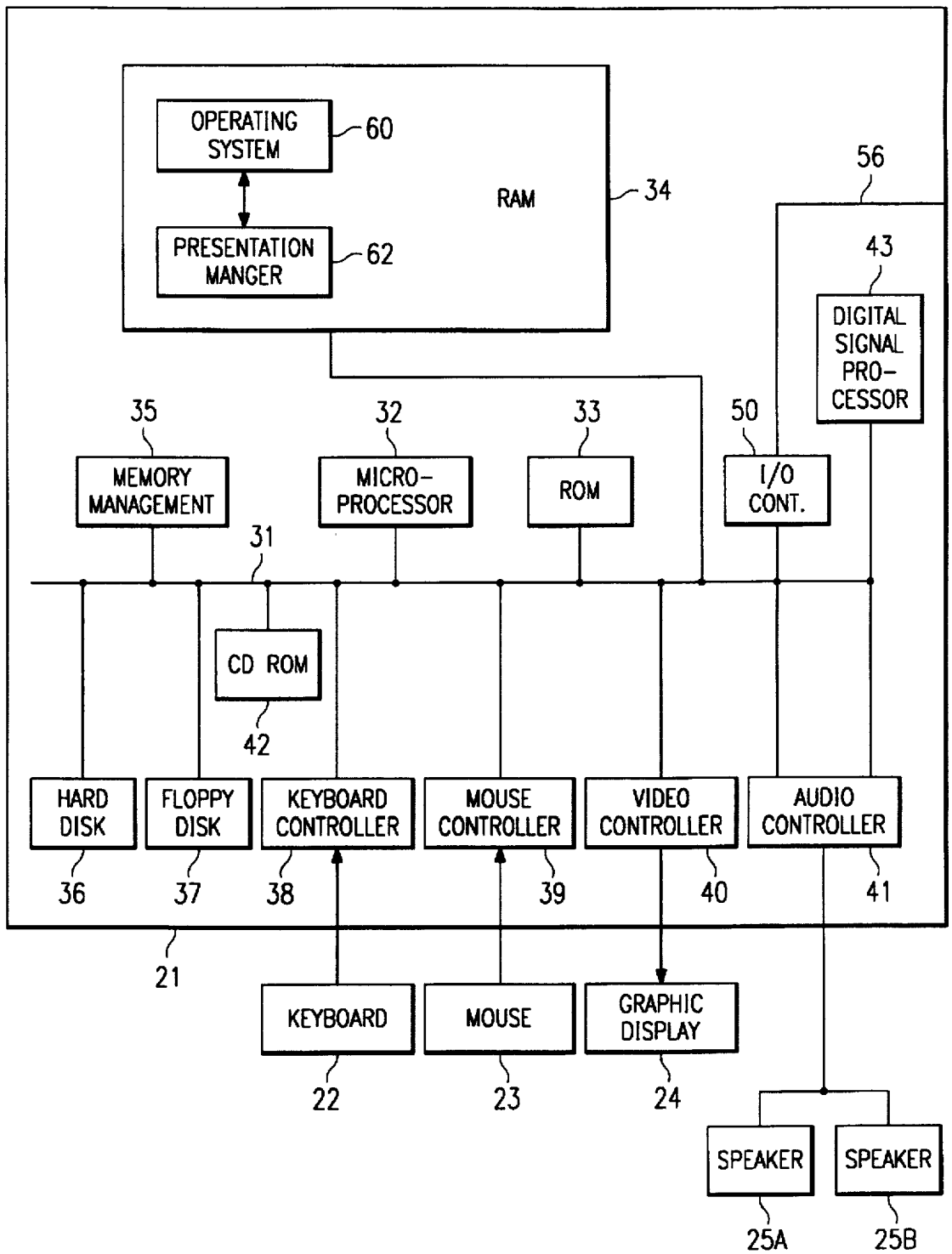
FIG. 5 is an architectural block diagram of the computer illustrated in FIG. 4.

FIG. 5 shows a block diagram of the components of the personal computer shown in FIG. 4. The system unit 21 includes a system bus or plurality of system buses 31 to which various components are coupled and by which communication between the various components is accomplished. The microprocessor 32 is connected to the system bus 31 and is supported by read only memory (ROM) 33 and random access memory (RAM) 34 also connected to system bus 31. A microprocessor in the IBM Multimedia PS/2 series of computers is one of the Intel family of microprocessors including the 386 or 486 microprocessors. However, as noted above, other microprocessors included, but not limited to, Motorola's family of microprocessors such as the 68000, 68020 or the 68030 microprocessors and various RISC microprocessors manufactured by IBM, Hewlett Packard, Sun, Intel, Motorola and others may be used in the specific computer.

The ROM 33 contains among other code the Basic Input-Output system (BIOS) which controls basic hardware operations such as the interaction and the disk drives and the keyboard. The RAM 34 is the main memory into which the operating system and application programs are loaded. The memory management chip 35 is connected to the system bus 31 and controls direct memory access operations including, passing data between the RAM 34 and hard disk drive 36 and floppy disk drive 37. The CD ROM 42, also coupled to the system bus 31, is used to store a large amount of data, e.g., a multimedia program or large database.

Also connected to this system bus 31 are various I/O controllers: the keyboard controller 38, the mouse controller 39, the video controller 40, and the audio controller 41. The keyboard controller 38 provides the hardware interface for the keyboard 22, the mouse controller 39 provides the hardware interface for the mouse 23, the video controller 40 is the hardware interface for the display 24, and the audio controller 41 is the hardware interface for the speakers 25a and 25b. An I/O controller 50 such as a Token Ring Adapter enables communication over a network 56 to other similarly configured data processing systems.

One of the preferred implementations of the present invention is as a set of instructions in a code module resident in the random access memory 34. Until required by the computer system, the set of instructions may be stored in another computer memory, for example, in the hard disk drive 36, in an optical disk for eventual use in the CD ROM 42 or in a floppy disk for eventual use in the floppy disk drive 37. As shown in the figure, the operating system 60 and the presentation manager 62 are resident in RAM 34.

Although the various applications of the class of pseudorandom functions described herein are quite varied, several applications can now be described. It should be appreciated, however, that these examples are merely illustrative and are not to be construed to limit the use of the inventive functions. These applications include local area network (LAN) message encryption, disk encryption, file encryption and pseudorandom number generation.

In typical applications requiring fast software cryptography, data encryption is required over the course of a communication session to a remote partner, or over the course of a login session to a particular machine. In either case, the key "a" which protects the session is determined at session setup. Typically, this session setup takes at least a few milliseconds and is therefore not a time-critical operation. It is therefore acceptable to spend some number of milliseconds at that time to map the relatively short key "a" to a (less concise) representation of the cryptographic transformation specialized to this key. The present invention is thus quite useful in this application.

Figure 6:
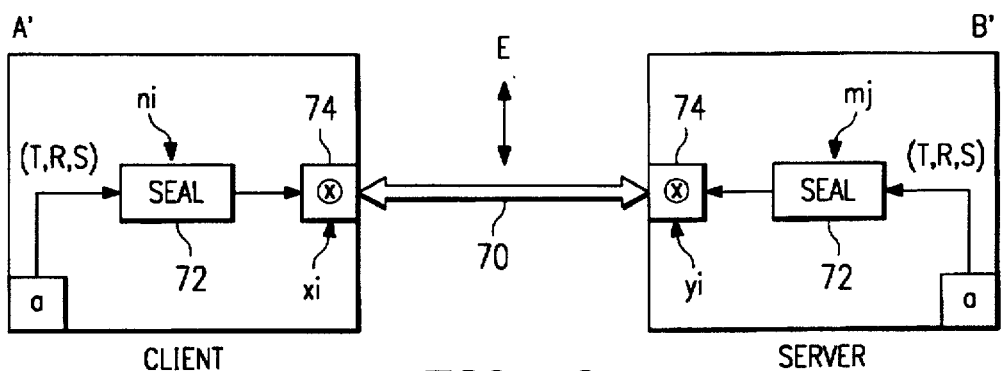
FIG. 6 illustrates a pair of processes A' and B' communicating over an insecure communication link with messages encrypted by the pseudorandom function of the invention.

Existing LAN communication products (e.g., IBM LAN Distance, IBM LAN Server, and the OSF DCE) are used where two entities, A' and B', are trying to communicate with one another over an insecure channel. FIG. 6 illustrates a pair of such processes A' and B' communicating over the insecure communication link 70. The designation "E" represents the adversary who witnesses the communication over the link 70. According to the invention, messages transmitted between the entities are encrypted with the pseudorandom function described above to facilitate secure communications over the link.

At the beginning of their communication session, an entity authentication protocol is executed which distributes to A' and B' a fresh and random session key a. According to the present invention, this key is used as the key a for SEAL. In particular, key a is mapped by A' and B' to T, R and S, and these tables are supplied to the pseudorandom function 72. The function 72 generates the pseudorandom bit string, which is then encrypted to the message ($x_i$ or $y_j$) via function 74 (typically an $\oplus$). Maintaining a counter on the number of messages sent to the other so far, A' and B' thus use these three tables to encrypt the messages which are a part of the communication session which has just begun. Illustrative details of this process are set forth below.

Messages sent from A' to B' are numbered $n_1$ for the first message, $n_2$ for the second message, and so forth. Messages sent from B' to A' are numbered $m_1$ for the first message, $m_2$ for the second message, and so forth. It is important that $n_i \neq n_j$ for all $i \neq j$. In other words, no party may use a sequence number twice. It is equally necessary that $n_i \neq m_j$ for all i and j. Thus, no sequence number used by A' may ever be used by B'. A numbering scheme meeting the above conditions is simple to construct. A' might use even sequence numbers $n_1=0$, $n_2=2$, $n_3=4$, and so on, reserving for B' the odd ones $m_1=1$, $m_2=3$, $m_3=5$, and so on. When A' wants to send her i-th message $x_i$ to B' she computes the first $|x_i|$ bits of $SEAL_a(n_1)$, which is denoted denote $pad_i$. Then A' sends to B' ($n_i$, $pad_i \oplus x_i$), which is her encryption of $x_i$. Similarly, when party B' wants to send his j-th message $y_j$ to A', he will send ($m_j$, $pad_j' \oplus y_j$), where $pad_j'$ is the first $|y_j|$ bits of $SEAL_a(m_j)$. In the unlikely event that there should be so many messages sent by some party that all his available sequence numbers get used up, the session must effectively be declared over. In this case a new session is set up, Complete with distribution of a new and random session key, a'.

Another application of the present invention is a device driver that transparently encrypts all disk accesses. In this application, the key a is not a session key but rather a string derived from a password $p_u$ that a user u enters when he turns his machine on. As an example, one might select $a = SHA(p_u) \oplus K_u$, with $K_u$ a 160-bit string associated to user u and stored on the machine's disk. When the operating system tries to read the i-th sector from the hard disk, the data there (i.e., the string x) is read and then decrypted by XOR-ing it with $SEAL_a(i)$. As many bits of SEAL are used as a sector is long. Similarly, when the operating system tries to write the i-th sector, the data to be written is first encrypted by XOR-ing with $SEAL_a(i)$. In the event that there is more than one disk whose contents are to be encrypted, indices are selected for each disk such that no two sectors receive the same index.

Figure 7:
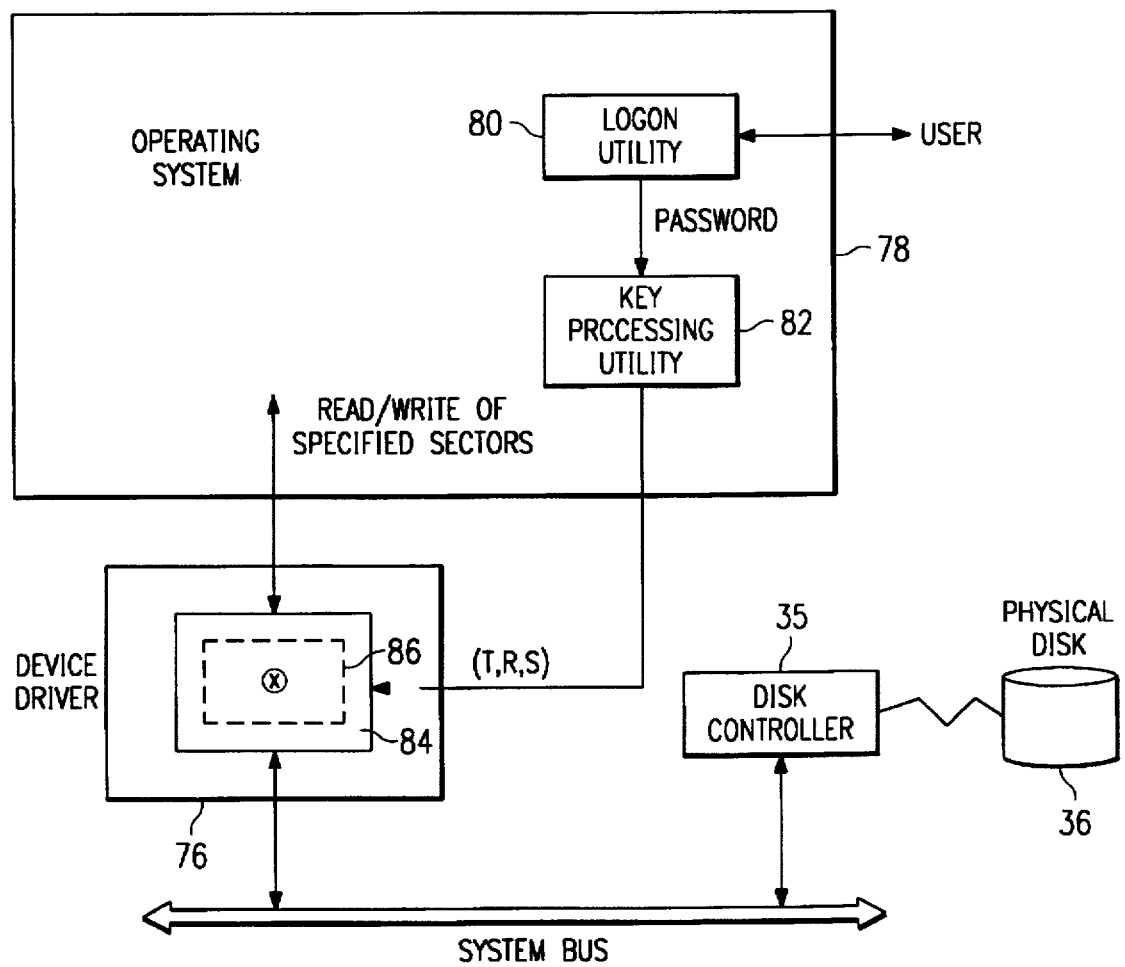
FIG. 7 illustrates a portion of the computer of FIG. 5 showing the pseudorandom function supported in the device driver to facilitate disk encryption.

FIG. 7 illustrates a portion of the computer of FIG. 5 showing the pseudorandom function supported in a device driver to facilitate such disk encryption. As used herein, the term "device driver" also includes terminate and stay-resident programs. In this example, the computer supports the device driver 76 which intercepts read or write calls directed to a mass storage device, in this case the hard disk 36 of the computer of FIG. 5. The read/write calls are communicated to the device driver 76 from the operating system 78. The operating system supports a login utility 80 that receives the password $p_u$ that the user enters when he turns the computer on. The login utility hands off the password to the key processing utility 82 that generates the tables T, R and S. The tables are supplied to the pseudorandom function 84 which then encrypts the disk data via the encryption function 86.

Figure 8:
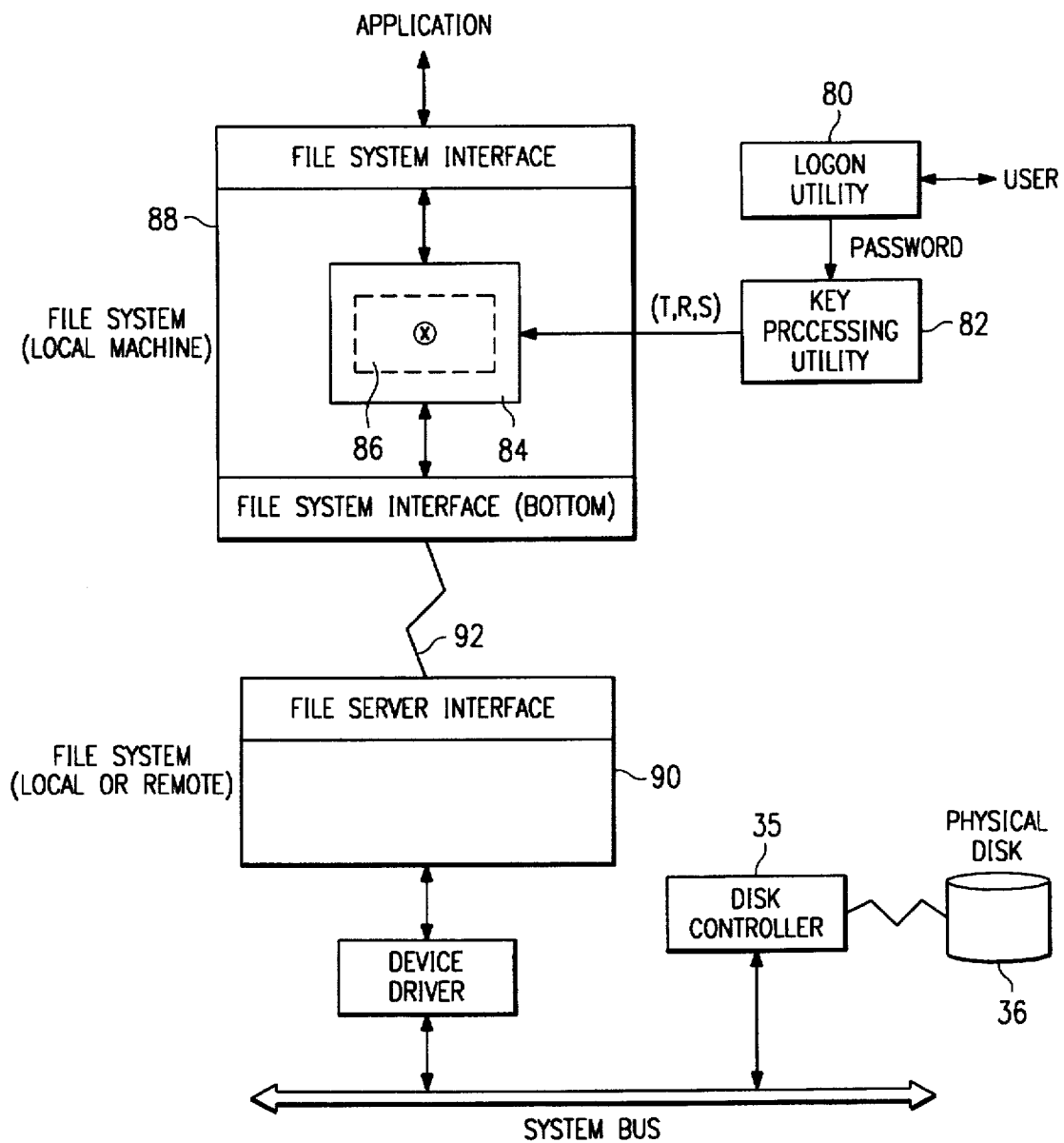
FIG. 8 illustrates a portion of the computer of FIG. 5 showing the pseudorandom function supported in the file system to facilitate both local and remote file encryption.

Yet another application of the pseudorandom function is file encryption. In this case, the string is a data file and the index is a unique file identifier associated with that particular file. FIG. 8 illustrates a portion of the computer of FIG. 5 showing the pseudorandom function supported in the file system to facilitate both local and remote file encryption. In this representative example, the files desired to be accessed by the application may reside in the local file system 88 or a remote file system 90 accessible to the local file system 88 via the communication link 92. As in FIG. 7, the login utility 80 collects the user's name and password and passes these to the key processing utility 82, which generates the tables R, R and S. These tables are supplied to the pseudorandom function 84, which generates the pseudorandom bit strings that are used by the encryption function 86 to encrypt the data files. The file systems include appropriate interface layers to communicate the read and write requests.

A still further application is fast pseudorandom number generation, useful for software applications requiring a source of unpredictable bits. In this case, the random key "a" is stretched to a much longer pseudorandom string defined by $SEAL_a(i_1) \| SEAL_a(i_2) \| \ldots$, where $(i_1, i_2, \ldots)$ is a simple sequence (e.g., 0, 1, 2, ...) of indices.

It should be appreciated by those skilled in the art that the specific embodiments disclosed above may be readily utilized as a basis for modifying or designing other routines for carrying out the same purposes of the present invention. For example, it should be readily appreciated that while the preferred embodiment implements the invention in 32-bit processor, the method is also applicable to other execution vehicles including 64-bit machines. Other parameters, like the length of "n", can easily be increased or otherwise changed. Those skilled in the art will recognize that such equivalent techniques and embodiments do not depart from the spirit and scope of the invention as set forth in the appended claims.

What is claimed is:

1. An article of manufacture, comprising:
   a computer-readable storage medium having a substrate; and
   computer program data encoded in the substrate of the computer-readable storage medium, wherein the storage medium so configured causes a computer to operate to encrypt a data string, wherein the computer program data comprises:
   means for using an index and a set of values from a table of pseudorandom numbers to generate initial values for a set of registers, the table having been precomputed from an encryption key;
   means for mixing at least some of the register values by taking a current value of a register and replacing the current value with a function of the current value and a value retrieved from the table;
   means responsive to the mixing means for repeatedly concatenating into a bit string a function of the register values until the bit string reaches a desired length; and
   means for encrypting the data string by combining the bit string and the data string.

2. The article of manufacture as described in claim 1 wherein the computer-readable storage medium is a floppy disk.

3. The article of manufacture as described in claim 1 wherein the computer-readable storage medium is a CD ROM.

4. The article of manufacture as described in claim 1 wherein the computer-readable storage medium is a hard disk.

5. The article of manufacture as described in claim 1 wherein the data string is a message to be communicated over an insecure channel and the index corresponds to a sequence number for the message.

6. The article of manufacture as described in claim 1 wherein the data string is a data block to be stored in a mass storage device of the computer and the index specifies a physical location of the data block with the mass storage device.

7. The article of manufacture as described in claim 1 wherein the data string is a data file and the index is a unique file identifier associated to the particular file.

8. The article of manufacture as described in claim 1 wherein the means for mixing comprises:
   means for retrieving the value from the table using a value derived from at least one other register; and
   means responsive to the retrieving means for replacing the value derived from the at least one other register.

9. The article of manufacture as described in claim 8 wherein the means for replacing comprises:
   means for circular shifting the value derived from the at least one other register by some predetermined amount.

* * * * *